March 27, 1962 B. H. STANSBURY, JR., ETAL 3,027,041
TABLEWARE DRAINER
Filed May 13, 1960 3 Sheets-Sheet 1
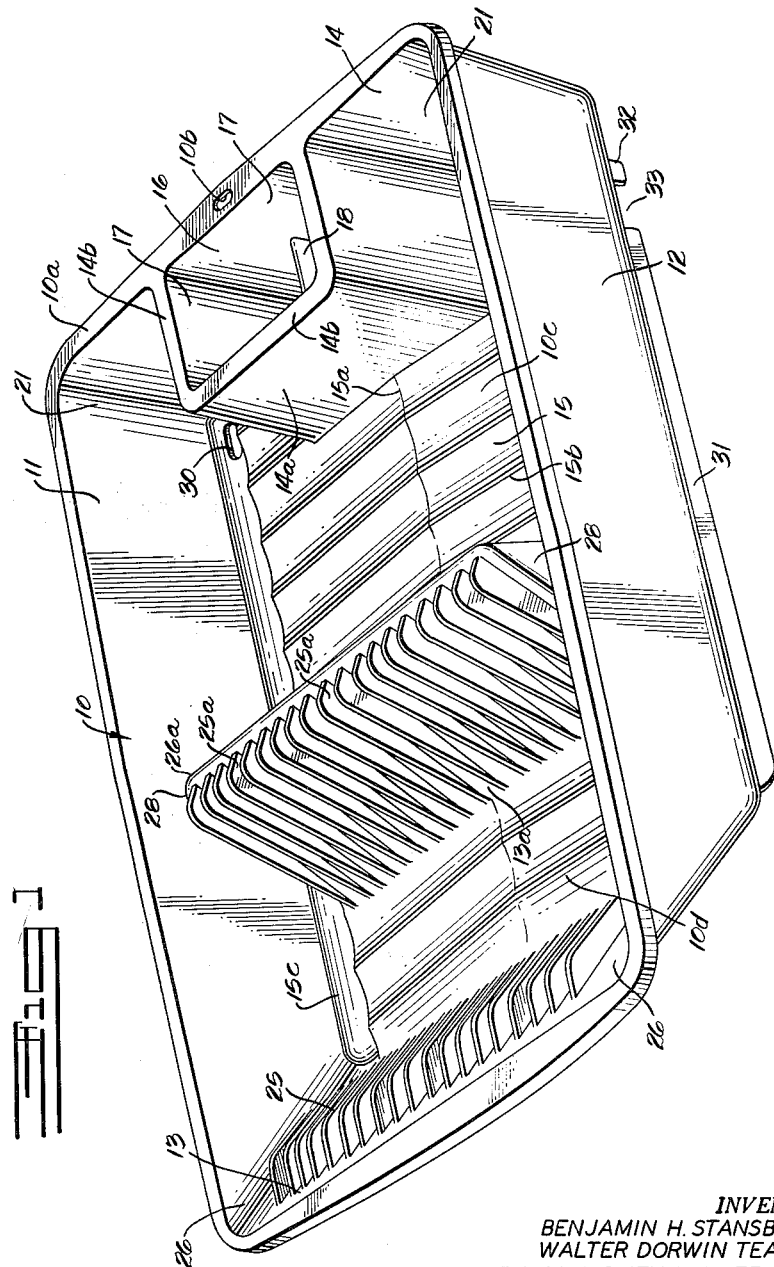
INVENTORS.
BENJAMIN H. STANSBURY, JR.
WALTER DORWIN TEAGUE, JR.
BY—MAHONEY, MILLER & RAMBO
BY—
ATTORNEYS.

March 27, 1962  B. H. STANSBURY, JR., ETAL  3,027,041
TABLEWARE DRAINER
Filed May 13, 1960  3 Sheets-Sheet 2
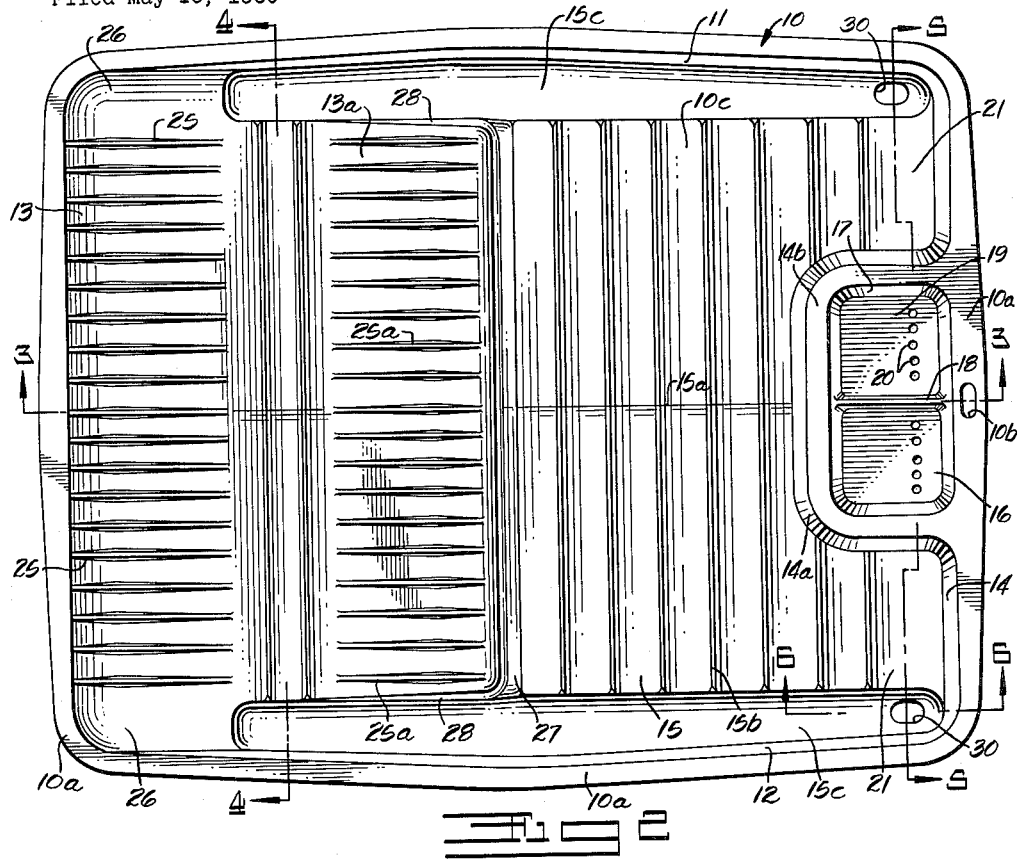
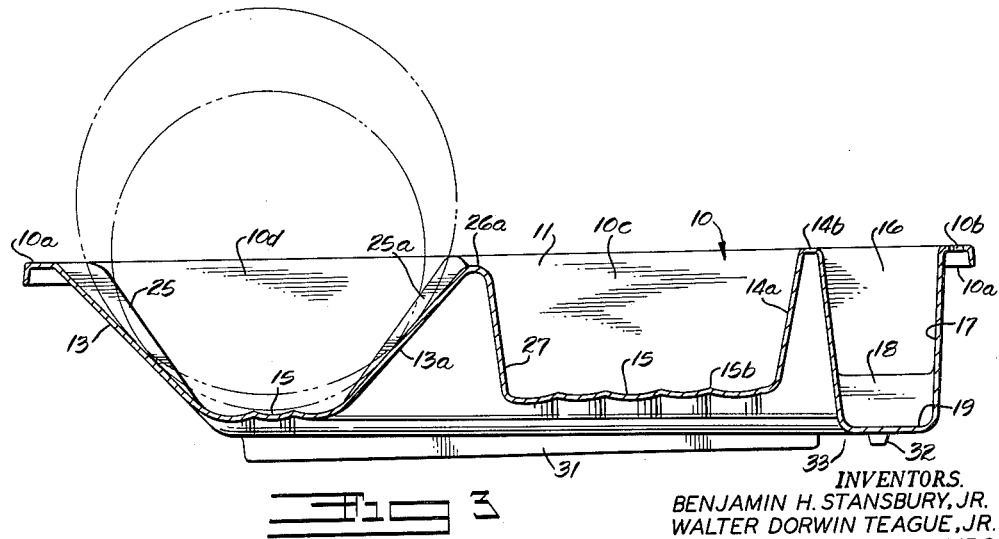
INVENTORS.
BENJAMIN H. STANSBURY, JR.
WALTER DORWIN TEAGUE, JR.
BY- MAHONEY, MILLER & RAMBO
BY- W.H. Rambo
ATTORNEYS.

March 27, 1962 B. H. STANSBURY, JR., ET AL 3,027,041
TABLEWARE DRAINER

Filed May 13, 1960 3 Sheets-Sheet 3

INVENTORS.
BENJAMIN H. STANSBURY, JR.
WALTER DORWIN TEAGUE, JR.
BY- MAHONEY, MILLER & RAMBO
BY-
ATTORNEYS.

United States Patent Office 3,027,041
Patented Mar. 27, 1962

3,027,041
TABLEWARE DRAINER
Benjamin H. Stansbury, Jr., and Walter Dorwin Teague, Jr., Alpine, N.J., assignors to Columbus Plastic Products, Inc., Columbus, Ohio, a corporation of Ohio
Filed May 13, 1960, Ser. No. 28,871
2 Claims. (Cl. 220—21)

This invention relates to a tableware drainer. It has to do, more particularly, with what is commonly known as a dish drainer but which not only receives dishes for draining, after they are washed, but also receives glassware, silverware, and other tableware.

Most dish drainers are formed as racks from wire, sometimes coated with protective material such as rubber, which are of open formation. The result is that silverware, cutlery, and other small articles tend to drop through the rack and in many cases, separate containers are provided for retaining the small objects. Also, quite often the rack is disposed on the drainboard of a sink and since there is no control of drainage from the rack, the water will drip through the bottom of the rack throughout its area. Consequently, unless a separate drain mat is provided under the dish drainer, the drainboard will become wet and will remain wet during the dish draining operation and must be dried after the operation. Furthermore, racks of this type are usually relatively difficult and expensive to fabricate.

It is the main object of this invention to provide a dish drainer which overcomes the objectionable features of the usual openwork rack.

It is a further object of this invention to provide a dish drainer which can be molded effectively and economically from suitable material in one piece.

Various other objects will be apparent.

In the accompanying drawings, there is illustrated a preferred embodiment of this invention and in these drawings:

FIGURE 1 is a perspective view of a dish drainer formed according to this invention;

FIGURE 2 is a plan view of the drainer;

FIGURE 3 is a longitudinal sectional view taken along line 3—3 of FIGURE 2;

With reference to the drawings, the drainer is illustrated as comprising a one-piece unit 10 which may be molded from suitable material such as synthetic resin or plastic, rubber, or other readily moldable material. However, the material preferred for molding this unit 10 is a high density polyethylene. It will be noted that the unit 10 is molded with solid walls rather than being formed as an openwork rack. It has a continuous outwardly projecting peripheral flange or lip 10a along its upper edge and at one end this flange may be provided with an opening 10b by means of which the drainer can be hung from a nail, screw or hook.

Figure 4:
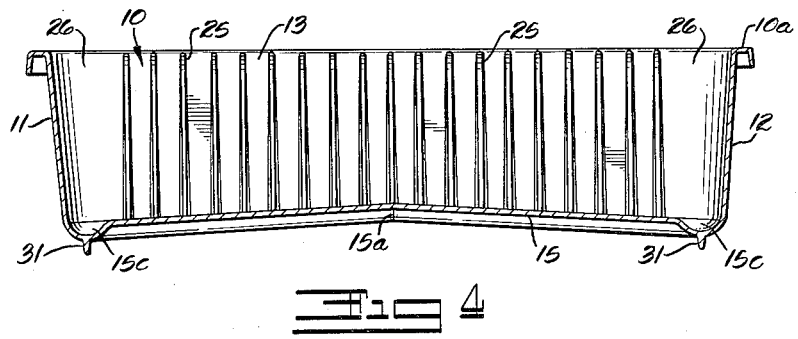
FIGURE 4 is a transverse sectional view taken along line 4—4 of FIGURE 2.
Figure 5:
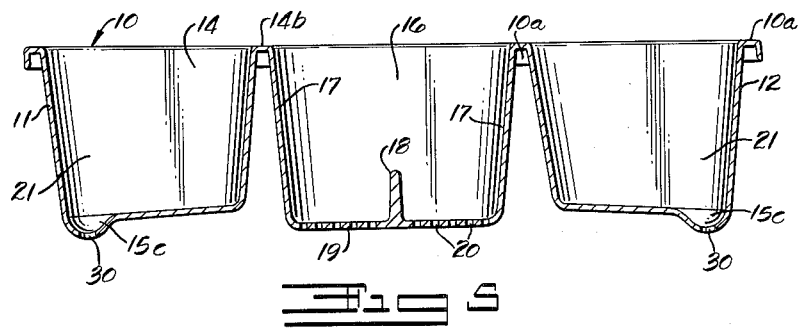
FIGURE 5 is a transverse sectional view taken along line 5—5 of FIGURE 2.

The unit 10 comprises the longitudinally extending, slightly outwardly bowed side walls 11 and 12 which are substantially vertically disposed but have a slight inward and downward draft, as indicated in FIGURE 4, to facilitate molding. These side walls 11 and 12 are joined integrally at one end to an outwardly inclined end wall 13 (FIGURES 1, 2 and 3). At the opposite end, the unit 10 is provided with an end wall 14 which is formed integrally with the side walls 11 and 12 and a bottom 15. The bottom 15 is also integrally joined to the wall members 11, 12 and 13. The end wall 14 has a central inwardly extending section 14a of U-form to provide a pocket 16 for cutlery or small objects. This pocket is of rectangular form and has wall portions 17 suspended from a flange 14b (FIGURES 3 and 5) on the end wall 14 and from a portion of the flange 10a extending along the corresponding end of the unit 10. Thus, the pocket 16 is of rectangular form and is provided with a transverse intermediate rib 18 which projects upwardly from the bottom 19 thereof. This bottom 19 is provided with drainage openings 20 at each side of the rib 18. Thus, at this end of the unit 10 which will be termed the drainage end, the pocket 16 is provided and extensions or wings 21 are provided at each side of the unit 10 which are extensions of and communicate with a main transverse pocket 10c of the unit. It will be apparent that the walls 17 of the pocket 16 are substantially vertically disposed but along with the main end wall 14 are provided with a slight inward and downward draft to facilitate molding.

The end wall 13, as previously indicated, is disposed at an angle and this angle is preferably approximately 45 degrees. On the inner surface of this wall 13 there are molded, in laterally spaced relationship, the plate positioning ribs 25. These ribs are in predetermined uniformly spaced relationship but it will be noted that there is a space 26 at each end of the wall 13 which is devoid of ribs. Spaced inwardly of the wall 13 is an oppositely angled wall 13a which cooperates therewith. This wall 13a has plate-spacig ribs 25a like the ribs 25 which are in corresponding number and are correspondingly spaced so that the ribs 25 and 25a are in the same longitudinal vertical planes. The rib-carrying walls 13 and 13a converge toward the bottom 15 of the unit 10. The rib-carrying wall 13a is formed on a transversely extending partition 26a which includes another substantially vertically disposed but slightly angled wall 27 (FIGURES 2 and 3) which is also integrally joined to the bottom 15. However, it will be noted from FIGURE 2 that this partition 26a terminates at the ends 28 which are spaced inwardly from the corresponding side walls 11 and 12. It will be apparent that the wall 13a also has an angle of approximately 45 degrees. Thus, plates of varying diameters may be received in the transverse pocket 10d (FIGURES 1 and 3) provided by the walls 13 and 13a between the side walls 11 and 12, as indicated by the broken lines in FIGURE 3.

In order to provide for drainage through each side of the unit, the bottom 15 is inclined laterally and downwardly in both directions from a center line 15a (FIGURES 1, 2 and 4). Furthermore, to facilitate this drainage, the exposed part of the bottom is transversely fluted or corrugated, as indicated at 15b. These corrugations on the inner surface of the bottom not only provide for drainage to opposite sides of the unit 10 but also serve as reinforcement for the bottom 15.

Figure 6:
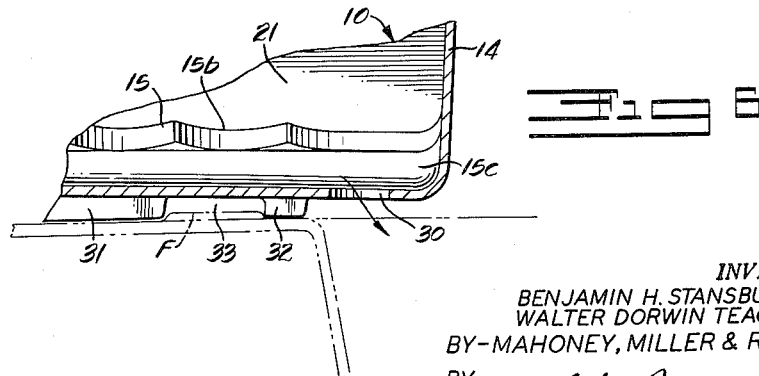
FIGURE 6 is a detail in section taken along line 6—6 of FIGURE 2.

The transverse drainage channels provided by the corrugated bottom communicate at their outer and lower ends with longitudinally extending drainage channels 15c also provided in the bottom 15. These drainage channels extend from the plate-receiving pocket 10d to the opposite end of the unit into the extensions 21 of the pocket 10c. At these ends, the channels 15c are provided with drainage openings 30. These channels 15c provide rib formations which extend slightly from the bottom 15 of the unit 10 and carry downwardly projecting support flanges 31 which extend longitudinally thereof. These flanges 31 (FIGURES 1, 3 and 6) taper toward the drainage end so that the drainage channels 15c will be inclined toward the openings 30 when the flanges 31 rest on a horizontal surface. Spaced from the end of each rib 31 is a stop lug 32 which provides a notch 33 there-between that will fit over the sink frame or flange F (FIGURE 6) on the edge of a sink to properly locate the drainer relative thereto so that the drain end of the drainer will project over the sink and the openings 30 will drain thereinto, as indicated. This will also position the drain openings 20 of the pocket 16 over the sink.

It will be apparent that this drainer can be readily molded from suitable material in one piece since it has a straight draw. It is so designed that it has a structurally stable shape to control warpage. It is so designed that there is an economical use of material and the unit will be of low weight. The unit can be used in association with a sink counter or drain board and no separate drain mat is needed to protect the counter. The plate-supporting arrangement is such that it will hold more plates in a smaller area and all plates are held securely so that they will not tip and fall out of the unit. Various size plates can be held and they can face in either direction. The plates are supported at the end of the unit opposite the drainage end, that is opposite the sink, so that it will not be necessary to reach over them in placing articles in the other pockets of the unit. The separate plate storage helps prevent chipping thereof from other articles and frees more usable areas for glassware etc. The drainer works equally well from left or right of the sink. The integral silverware pocket prevents the silverware from becoming caught or mixed with other articles. The free space at each end of the intermediate plate-supporting partition provides space for long knives or large platters. The drainage is complete and is controlled so that all water is directed to the two corners where the main drain openings are provided for draining into the sink. The smooth solid walls provide for easy cleaning. The unit is sufficiently attractive that it can be used for countertop storage. It can be hung up out of the way when not in use. It will resist wear and there is no danger of rust stains. Furthermore, the design is such that it naturally suggests the best arrangement of the article to the user. The continuous upper flange and shape of the entire unit plus the plate holder which holds the plates more rigid and effective makes carrying of the unit convenient and easy whether full or empty.

Various other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A table ware drainer comprising a generally rectangular receptacle of integral, one piece construction including a bottom wall, relatively upstanding and opposed side and end walls and an intermediate, transversely extending division wall disposed in longitudinally spaced relation to one of the end walls of the receptacle, said division wall and said last-named end wall being inclined downwardly and inwardly toward the bottom wall of said receptacle in relatively convergent relation and each being formed with opposed sets of relatively spaced parallel ribs defining in one end portion of said receptacle a transverse dish-supporting rack; the bottom wall of said receptacle, throughout its major portion being formed with transverse corrugations and being inclined laterally in opposite directions from the longitudinal center line of said receptacle toward the side walls thereof, and said bottom wall being formed adjacent said side walls with a pair of longitudinally extending drainage troughs communicating with the transverse corrugations of said bottom wall, and a pair of drain openings formed in the drainage troughs of said bottom wall adjacent the other end wall of said receptacle, said drainage troughs being longitudinally coextensive with said bottom wall and being arranged to receive liquid by gravitational flow from the laterally inclined, corrugated portions of said bottom wall and to conduct such liquid toward said drain openings.

2. A tableware drainer as defined in claim 1, wherein the end wall of said receptacle opposite said dish-supporting rack is formed to include an upwardly opening, cutlery-receiving well.

References Cited in the file of this patent

UNITED STATES PATENTS

| | | |
|---|---|---|
| D. 151,047 | Jensen | Sept. 21, 1948 |
| 2,885,087 | Bliss | May 5, 1959 |
| 2,936,898 | Miguez | May 17, 1960 |
| 2,954,875 | Becker | Oct. 4, 1960 |